United States Patent [19]

Eranian et al.

[11] Patent Number: 5,256,725
[45] Date of Patent: Oct. 26, 1993

[54] POLYMERIZABLE LUMINESCENT FLUID COMPOSITION AND ITS USE

[75] Inventors: Armand Eranian, Sevres; Eric Jacquinot, Attichy, both of France

[73] Assignee: Societe Francaise Hoechst, Puteaux, France

[21] Appl. No.: 894,326

[22] Filed: Jun. 4, 1992

[30] Foreign Application Priority Data

Jun. 14, 1991 [FR] France ............................... 91 07312

[51] Int. Cl.$^5$ .............................................. C08F 2/30
[52] U.S. Cl. ................................... 524/558; 524/418; 524/420; 524/431; 524/432; 523/172; 252/301.4 R; 252/301.5; 252/301.45; 252/301.4 P; 252/301.4 F; 252/301.4 H
[58] Field of Search ............... 524/558, 418, 420, 431, 524/432; 523/172; 252/301.4 R, 301.5, 301.6 R, 301.6 S, 301.6 P, 301.6 F, 301.4 S, 301.4 P, 301.4 F, 301.4 H, 700

[56] References Cited

U.S. PATENT DOCUMENTS 5,076,963  12/1991  Kameyama et al. ......... 252/301.4 R

FOREIGN PATENT DOCUMENTS 0333162  9/1989  European Pat. Off. .
2566791  4/1983  France .

Primary Examiner—Paul R. Michl
Assistant Examiner—Edward Cain
Attorney, Agent, or Firm—Browdy and Neimark

[57] ABSTRACT

Polymerizable luminescent fluid composition, characterized by the fact that it contains by weight (a) 30 to 45% of one or more luminescent mineral pigments, (b) 10 to 30% of silica particles, having a diameter comprised between 7 and 1000 nm, not linked to each other by siloxane bonds, and (c) the complement to 100% of 2-hydroxy ethyl acrylate and/or 2-hydroxy ethyl methacrylate and use for obtaining luminescent compounds.

14 Claims, No Drawings

POLYMERIZABLE LUMINESCENT FLUID COMPOSITION AND ITS USE

FIELD OF INVENTION

The present invention relates to a polymerizable luminescent fluid composition and its use.

BACKGROUND

In order to improve personal safety, more and more luminescent panels are used and those which have the highest possible density of luminescent pigments per unit area are now being sought so as to obtain a long illumination life.

Furthermore, given that most of the mineral luminescent pigments are sensitive to the combined action of humidity and ultraviolet rays, an attempt has been made to protect them by incorporating them with a transparent resin which is then generally fixed on a solid support (cf. Encyclopedia of Chemical Technology, KIRK-OTHMER, 3rd edition, volume 14, pages 559–562) The standard luminescent pigments are mineral products, generally based on zinc sulphide doped with certain metals, which have a high volumetric mass and when they are put in suspension in a polymerizable fluid resin, they settle very rapidly, which leads, after polymerization of the resin, to a solid product with heterogeneous luminosity, and which is more intense the larger the quantity of pigment. In addition, patsy compositions are known, from the European Patent Application No. 333,162, containing phosphorous and optionally powdered silica dispersed in an organic solvent containing a polymer based on alkyl methacrylate and at least 0.1% by weight of a monomer chosen from ethylenic carboxylic acids and hydroxyalkyl (meth)acrylates, optionally mixed with another copolymerizable vinyl monomer, but when these pasty compositions are used, it is necessary to drive off relatively large quantities of organic solvent, which is costly and very restricting. In order to obviate these disadvantages, the Applicant has discovered a polymerizable luminescent fluid composition, having a long shelf-life and allowing luminescent panels possessing a high and homogeneous density of luminescent pigments per unit of volume to be obtained.

SUMMARY

The polymerizable luminescent fluid composition according to the present invention is characterized by the fact that it contains by weight (a) 30 to 45% of one or more luminescent mineral pigments, (b) 10 to 30% of silica particles, of a diameter comprised between 7 and 1000 nm, not linked to each other by siloxane bonds, and (c) the complement to 100% of 2-hydroxy ethyl acrylate and/or 2-hydroxy ethyl methacrylate.

DETAILED DESCRIPTION OF EMBODIMENTS

By luminescent mineral pigments is meant known luminescent mineral pigments described in particular in the Encyclopedia of Chemical Technology, KIRK-OTHMER, 3rd edition, volume 17, pages 835–836, such as zinc sulphide doped with copper or cobalt. Among the mineral pigments, there are particularly preferred those sold by the assignee, Societe Francaise Heochst, --; under the name LUMILUX ®.

A more particular subject of the invention is the compositions as defined above characterized in that the silica particles not linked to each other by siloxane bonds have a diameter between 7 and 100 nm. There are also preferred silica particles which contain at least one surface silanol group per nm2 esterified either with 2hydroxy ethyl methacrylate or with 2-hydroxy ethyl acrylate.

The silica particles partially esterified on the surface with the alcohol function of the 2-hydroxy ethyl (meth)acrylate(s), having a diameter comprised between 7 and 1000 nm and not linked to each other by siloxane bridges, are also known products and they can be prepared by one of the processes described by Ralph K. IDLER, The Chemistry of Silica, pages 412–414, John Wiley and Sons, New York, 1979. Mixtures of silica and 2-hydroxy ethyl (meth)acrylate are generally marketed by the assignee under the name HIGHLINK OG 100 ® and HIGHLINK OG 101 ®.

A more particular subject of the invention is the compositions as defined above characterized in that the constituent mentioned in point (c) is either a mixture of 2-hydroxy ethyl methacrylate and 2-hydroxy ethyl acrylate, or, preferably, 2-hydroxy ethyl methacrylate.

A quite particular subject of the invention is the compositions as defined above characterized in that they contain by weight 30 to 45% of one or more luminescent mineral pigments, 10 to 30% expressed in SiO2 of silica particles partially esterified on the surface, and the complement to 100% of 2-hydroxy ethyl methacrylate on its own or mixed with 2-hydroxy ethyl acrylate.

Among these products, there can be mentioned more particularly a polymerizable luminescent fluid composition containing by weight 40% of zinc sulphide doped with copper or cobalt, 10 to 30% of silica and the complement to 100% of 2-hydroxy ethyl methacrylate.

The fluid compositions according to the present invention can also contain in addition standard additives such as adherence promoters, anti-oxidants, dispersing agents and, optionally, promoter agents of free radicals by thermal decomposition, such as in particular azo derivatives. The total weight of additives optionally introduced into the composition according to the present invention preferably does not exceed 3% by weight of the total weight of the composition.

The compositions according to the present invention can also contain in addition either one or more $C_1$–$C_4$ alkyl (meth)acrylates such as methyl acrylate, ethyl acrylate, butyl acrylate, methyl methacrylate, ethyl methacrylate, butyl methacrylate, or one or more $C_3$–$C_5$ hydroxyalkyl (meth)acrylates such as 2-hydroxy propyl acrylate, 3-hydroxy propyl acrylate, 2-hydroxy propyl methacrylate and 3-hydroxy propyl methacrylate, or their mixtures in variable proportions. The ratio by weight between the weight M of these different monomers and that of 2-hydroxy ethyl acrylate and/or 2-hydroxy ethyl methacrylate is preferably comprised between 0 and 6, i.e. the amount such additional monomers may be as much as six times the amount of the essential 2-hydroxy ethyl acrylate and/or methacrylate.

Kinetic examination of the photopolymerization of the compositions according to the present invention was carried out by infrared spectroscopy determined with respect to time. It is observed that it has a high reactivity, clearly higher than an identical composition containing no colloidal silica. This high reactivity permits, after polymerization, high conversion rates to be obtained so that the final product has an extremely low content of residual (meth)acrylic derivatives.

The compositions according to the present invention are fluid even for high concentrations of silica and/or of luminescent pigments.

The compositions according to the present invention are intended to be polymerized. Due to their high reactivity this polymerization can be initiated at a relatively low temperature, lower than 60° C., and with a low content of polymerization initiator. Quite obviously, the initiation temperature is a function in particular of the nature of the initiating agent used. Advantageously, the polymerization initiator chosen is a known azo initiator which thermally decomposes at the desired temperature, usually around 50° C. Once the polymerization reaction is initiated, either by standard initiators such as those of peroxide type, or preferably by known initiators of azo type, polymerization is allowed to develop, and then, if necessary, it is terminated by gentle heating at a temperature of less than 70° C. for 30 to 60 minutes. In this way a solid compound is obtained which has no bubbles or cracks and in which the luminescent pigments used are evenly distributed. During the preparation of very thick luminescent solid compounds, it is often beneficial to use a composition according to the present invention, containing by weight more monomers of the methacrylic acid family than of the acrylic acid family. Indeed, the acrylic monomers are clearly more reactive than the methacrylic monomers and, during polymerization, the exothermic reaction sometimes develops too quickly leading to local overheating which may damage the solid support used and/or lead to delamination.

The compositions according to the present invention are obtained by simple mixing of their various constituents.

Also a subject of the present invention is the use of the compositions according to the invention for obtaining luminescent solid compounds, for example luminescent films, sheets or blocks. One of the advantages of the compositions according to the present invention is their fluidity, which allows them to be introduced into volumes of various sizes then to be polymerized in situ after addition, if necessary, of a polymerization initiator. Another advantage of the compositions according to the invention is their relatively long shelf life which permits them to be used some time after their preparation without an appreciable settlement of the mineral pigments being observed.

The Brookfield viscosities mentioned in the examples were determined using a Rheomat 115 viscometer.

The following examples illustrate the present invention without however limiting it.

EXAMPLE 1

20 g of LUMILUX ®, Green Mix, reference 50085, marketed by the assignee, is mixed at ambient temperature and under agitation with 30 g of HIGHLINK OG 100 ®, also marketed by the Applicant, containing by weight about 70% of 2-hydroxy ethyl methacrylate, 30% of silica in the form of silica particles having an average diameter, of 13 nm, not linked to each other by siloxane bonds and containing less than 1% water, and having a grafting rate of 2.3, that is the number of Si—O—$CH_2$—$CH_2$—O CO—$C(CH_3)$=$CH_2$ groups per nm2 of silica particle surface is 2.3. The grafting rate is determined by the method described by E.C. Broge in the U.S. Pat No. 2,736,668.

A sample placed in a 50 ml graduated measuring cylinder, left at rest at ambient temperature for 40 minutes, separated only slightly, i.e. only one pigment-free phase of about 2 cm depth was found at the top. This low settlement is surprising given the very low viscosity of HIGHLINK OG 100 ® (Brookfield viscosity at 20° C. and at 780 rev/min: 44 mPa.s).

0.3 g of 2,2'-azobis(2,4-dimethylvaleronitrile) is introduced at ambient temperature into this composition, that is 0.6% relative to the total weight of the composition, then it is poured into a narrow gap of 1.5 mm between two glass plates held by a plastic joint. The whole assembly is then heated externally at 50° C. for 30 minutes. The exothermic reaction of polymerization starts, then when the temperature of the whole body again returns to 50° C., this temperature is maintained by external heating. After cooling down to ambient temperature, a homogeneous, solid luminescent panel is obtained, with no bubbles or cracks or delamination, constituted by luminescent pigments trapped inside a resin contained between two glass plates.

EXAMPLE 2

67 g of LUMILUX ®, Green Mix, reference 50085, is mixed at ambient temperature and under agitation with 80 g of HIGHLINK OG 100 ®and 20 g of HIGHLINK OG 101 ®, marketed by the assignee. In this way 167 g of composition according to the present invention is obtained. The HIGHLINK OG 101 ® contains by weight 70% of 2-hydroxy ethyl acrylate, 30% of silica in the form of silica particles having an average diameter of 13 nm, not linked to each other by siloxane bonds and less than 1% water, and has a Brookfield viscosity determined at 20° C. at a speed of 780 rev/min of 40 mPa.s and a grafting rate of 2.4.

0.6 g (0.36% by weight) of 2,2'-azobis(2,4-dimethyvaleronitrile) is then introduced into the preceding composition, and it is poured into a 2 mm gap between two glass plates held by a plastic joint. The whole assembly is maintained for 45 minutes at 50° C., then it is cooled down to ambient temperature. In this way a luminescent panel is obtained with no bubbles, or cracks, or delamination, having a homogeneous density of luminescent pigments.

EXAMPLE 3

43.6 g of LUMILUX ®, Green Mix, reference 50085, is mixed at ambient temperature and under agitation with 40 g of n-butyl methacrylate and 25 g of HIGHLINK OG 101/61 ®containing by weight 40% of 2-hydroxy ethyl acrylate and 60% of silica in the form of silica particles having an average diameter of 13 nm, not linked to each other by siloxane bonds and having a Brookfield viscosity determined at 20° C. at a speed of 780 rev/min of 2600 mPa.s.

The ratio by weight of butyl acrylate/2-hydroxy ethyl acrylate is 4.

4 g of benzoyl peroxide at 75% in water is introduced at ambient temperature and under agitation into this mixture, then the reaction medium is heated progressively to 65° C. under reduced pressure, until polymerization is completed, which takes 30 minutes. After cooling down to ambient temperature, a luminescent solid compound is obtained having a homogeneous density of pigments.

EXAMPLE 4

The following are mixed at ambient temperature, under agitation:

16.7 g of HIGHLINK OG 100 ® defined previously, 11.7 g of n-butyl methacrylate, 19.0 g of LUMILUX ®, Green Mix, reference 50085.

Next 0.18 g of azobisisobutyronitrile is introduced into this mixture under agitation and at ambient temperature, and then this solution is heated progressively to 35° C. At this temperature the polymerization reaction starts and it is completely finished in 10 minutes. After cooling down to ambient temperature, a luminescent solid compound is obtained which has no bubbles or cracks and has a homogeneous density of luminescent pigments.

We claim:

1. Polymerizable luminescent fluid composition, consisting essentially of by weight (a) 30 to 45% of one or more inorganic luminescent pigments, (b) 10 to 30% of silica particles, having a diameter comprised between 7 and 1000 nm, not linked to each other by siloxane bonds, and (c) the complement to 100% of 2-hydroxy ethyl acrylate and/or 2-hydroxy ethyl methacrylate.

2. Composition according to claim 1, characterized by the fact that the silica particles contain at least one surface silanol group per nm2 esterified by a 2-hydroxy ethyl acrylate or methacrylate.

3. Composition according to claim 2, characterized by the fact that the silica particles have a diameter comprised between 7 and 100,nm.

4. Composition according to claim 1, characterized by the fact that it contains in addition one or more $C_1$–$C_4$ alkyl (meth)acrylates in a ratio by weight of $C_1$–$C_4$ alkyl (meth)acrylate to 2-hydroxy ethyl (meth)acrylate comprised between 0 and 6.

5. Composition according to claim 1, characterized by the fact that they contain in addition one or more $C_3$–$C_5$ hydroxyalkyl (meth)acrylates in a ratio by weight of $C_3$–$C_5$ hydroxyalkyl (meth)acrylate to 2-hydroxy ethyl (meth)acrylate comprised between 0 and 6.

6. Composition according claim 1, characterized by the fact that it contains in addition a mixture in variable proportions, M, of one or more $C_1$–$C_4$ alkyl (methy)acrylates and one or more $C_3$–$C_5$ hydroxyalkyl (meth)acrylates in a ratio by weight of M to 2-hydroxy ethyl (meth)acrylate comprised between 0 and 6.

7. A composition according to claim 1 wherein said silica particles have diameter of 7–100 nm.

8. A composition according to claim 2 further comprising at least one additional monomer selected from the group consisting of C1–C4 alkyl (meth)acrylates and C3–C5 hydroxy alkyl (meth)acrylates in an amount of up to six times the amount of said 2-hydroxy ethyl acrylate and 2- hydroxy ethyl methacrylate.

9. A composition according to claim 1 further comprising up to 3% by weight of the total weight of the composition of an additive selected from the group consisting of adherence promoters, anti-oxidants, dispersing agents and free-radical promoters.

10. A luminescent solid body consisting essentially of, by weight, (a) 10 to 45% of at least one inorganic luminescent pigment, (b) 10 to 30% of silica particles having a diameter between 7 and 1000 nm, not linked to each other by siloxane bonds, and (c) a polymer formed of at least one monomer of 2-hydroxy ethyl acrylate and 2-hydroxy ethyl methacrylate, monomer providing the complement up to 100% based on the total of (a), (b) and said monomer, said polymer optionally containing an additional polymerized monomer in an amount up to six times the quantity of said 2- hydroxy ethyl acrylate and 2-hydroxy ethyl methacrylate, said additional monomer being selected from the group consisting of C1–C4 alkyl (meth)acrylates and C3–C5 hydroxy alkyl (meth)acrylates.

11. A solid body according to claim 10 wherein said silica particles contain at least one surface silanol group per nm2 esterified by a2-hydroxy ethyl acrylate or methacrylate.

12. A solid body according to claim 11 wherein the silica particles have a diameter between 7 and 100 nm.

13. A solid body according to claim 10 wherein the silica particles have a diameter comprised between 7 and 100 nm.

14. A solid body according to claim 10 prepared by mixing said inorganic luminescent pigment and said silica particles with a monomer of said polymer before polymerizing the monomer.

* * * * *